(12) United States Patent
Lu et al.

(10) Patent No.: US 10,077,915 B2
(45) Date of Patent: Sep. 18, 2018

(54) ON-LINE OPTIMIZATION SCHEME FOR HVAC DEMAND RESPONSE

(71) Applicant: Siemens Corporation, Orlando, FL (US)

(72) Inventors: Yan Lu, West Windsor, NJ (US); Ling Shen, Cherry Hill, NJ (US); Jianmin Zhu, Piscataway, NJ (US)

(73) Assignee: Siemens Corporation, Iselin, NJ (US)

( * ) Notice: Subject to any disclaimer, the term of this patent is extended or adjusted under 35 U.S.C. 154(b) by 595 days.

(21) Appl. No.: 14/433,860

(22) PCT Filed: Oct. 10, 2013

(86) PCT No.: PCT/US2013/064305
§ 371 (c)(1),
(2) Date: Apr. 7, 2015

(87) PCT Pub. No.: WO2014/059123
PCT Pub. Date: Apr. 17, 2014

(65) Prior Publication Data
US 2015/0253027 A1    Sep. 10, 2015

Related U.S. Application Data

(60) Provisional application No. 61/712,494, filed on Oct. 11, 2012.

(51) Int. Cl.
*F24F 11/00* (2018.01)
*G05B 15/02* (2006.01)
(Continued)

(52) U.S. Cl.
CPC ............ *F24F 11/006* (2013.01); *F24F 11/30* (2018.01); *F24F 11/62* (2018.01);
(Continued)

(58) Field of Classification Search
CPC ............ F24F 11/006; F24F 2011/0075; F24F 2011/0046; F24F 2011/0047;
(Continued)

(56) References Cited

U.S. PATENT DOCUMENTS

| 4,916,909 A | 4/1990 | Gabel |
|---|---|---|
| 9,865,418 B2 | 1/2018 | Yang |

(Continued)

FOREIGN PATENT DOCUMENTS

| CN | 102375443 A | 3/2012 |
|---|---|---|
| CN | 102576451 A | 7/2012 |

(Continued)

OTHER PUBLICATIONS

Report of Examination dated Jul. 19, 2017; Chinese Patent Application No: 201380064714.5; Filing Date: Oct. 10, 2013; 6-pages.

(Continued)

*Primary Examiner* — Nathan L Laughlin

(57) ABSTRACT

A computer-implemented method of optimizing demand-response (DR) of a heating, ventilation, and air-conditioning (HVAC) system of a building, includes determining (30, 31, 32) a value of an objective function $F_{ij}$ of a HVAC system for each of a plurality of DR strategies j for each of a plurality of weather patterns i that is a weighted sum of an energy cost of the HVAC system and a thermal comfort loss of the HVAC system, assigning (33, 34, 35, 36) a likelihood score $L_{ij}$ to each of a selected subset of near-optimal DR strategies j for each weather pattern i, and selecting (37, 38) those near-optimal DR strategies with large overall likelihood scores $L_j$ to create an optimal strategy pool of DR strategies. An optimal strategy pool can be searched (39) in real-time for an optimal DR strategy for a given weather pattern.

20 Claims, 13 Drawing Sheets

(51) Int. Cl.
*G06Q 10/04* (2012.01)
*G05B 13/02* (2006.01)
*F24F 11/30* (2018.01)
*F24F 11/62* (2018.01)
*F24F 140/50* (2018.01)
*F24F 140/60* (2018.01)
*F24F 130/00* (2018.01)
*F24F 130/10* (2018.01)
*F24F 11/46* (2018.01)

(52) U.S. Cl.
CPC ......... *G05B 13/0205* (2013.01); *G05B 15/02* (2013.01); *G06Q 10/04* (2013.01); *F24F 11/46* (2018.01); *F24F 2130/00* (2018.01); *F24F 2130/10* (2018.01); *F24F 2140/50* (2018.01); *F24F 2140/60* (2018.01); *G05B 2219/2614* (2013.01); *G05B 2219/2642* (2013.01)

(58) Field of Classification Search
CPC ......... F24F 2011/0058; G05B 13/0205; G05B 15/02; G05B 2219/2642; G05B 2219/2614; G06Q 10/04
See application file for complete search history.

(56) References Cited

U.S. PATENT DOCUMENTS

2011/0066299 A1  3/2011  Hope
2011/0231320 A1* 9/2011  Irving .................... G06Q 30/00
                                                      705/80
2012/0022700 A1  1/2012  Kummer

FOREIGN PATENT DOCUMENTS

CN   102597639 A    7/2012
EP     2402828 A2   1/2012
WO  2010129913 A1  11/2010
WO  2011072332 A1   6/2011

OTHER PUBLICATIONS

Mexican office action dated May 4, 2018, for MX Application 2015/004684, 3 pages.

* cited by examiner

Table 1

| Weather Pattern # | Optimal DR Strategy | | | | | Baseline Peak Load (kW) | Optimal Peak Load (kW) | Peak Load Reduction (kW) |
|---|---|---|---|---|---|---|---|---|
| | ID* | GTA(T1)* | GTA(T2)* | GTA(T3)* | SAT* | SFP* | | |
| 1 | 4817 | 9 | 10 | 18 | 60 | 1150 | 531 | 480 | 51 |
| 2 | 4823 | 9 | 12 | 18 | 60 | 1150 | 603 | 495 | 109 |
| 3 | 4818 | 9 | 10 | 19 | 60 | 1150 | 520 | 476 | 43 |
| 4 | 4818 | 9 | 10 | 19 | 60 | 1150 | 512 | 473 | 38 |
| 5 | 4818 | 9 | 10 | 19 | 60 | 1150 | 512 | 474 | 38 |
| 6 | 4755 | 6 | 7 | 19 | 60 | 1150 | 482 | 457 | 24 |
| 7 | 4818 | 9 | 10 | 19 | 60 | 1150 | 487 | 462 | 25 |
| 8 | 4800 | 8 | 9 | 19 | 60 | 1150 | 478 | 454 | 25 |
| 9 | 4818 | 9 | 10 | 19 | 60 | 1150 | 502 | 469 | 32 |
| 10 | 4818 | 9 | 10 | 19 | 60 | 1150 | 497 | 469 | 29 |
| 11 | 4818 | 9 | 10 | 19 | 60 | 1150 | 500 | 469 | 31 |
| 12 | 4818 | 9 | 10 | 19 | 60 | 1150 | 495 | 468 | 27 |
| 13 | 4818 | 9 | 10 | 19 | 60 | 1150 | 481 | 458 | 23 |
| 14 | 4818 | 9 | 10 | 19 | 60 | 1150 | 475 | 452 | 24 |
| 15 | 4818 | 9 | 10 | 19 | 60 | 1150 | 476 | 452 | 24 |
| 16 | 4755 | 6 | 7 | 19 | 60 | 1150 | 467 | 444 | 23 |
| 17 | 4755 | 6 | 7 | 19 | 60 | 1150 | 472 | 449 | 23 |
| 18 | 4755 | 6 | 7 | 19 | 60 | 1150 | 468 | 445 | 23 |
| 19 | 4755 | 6 | 7 | 19 | 60 | 1150 | 463 | 441 | 22 |

FIG. 5

Table 2

| | |
|---|---|
| Population size | 50 |
| Creation function | Uniform |
| Scaling function | Rank |
| Selection function | Stochastic Uniform |
| Elite count | 2 |
| Crossover fraction | 0.8 |
| Crossover function | Scattered |
| Mutation function | Uniform with rate=0.3 |
| Maximum generation | 20 |
| Function tolerance | 1.00E-06 |

FIG. 6

Table 3

| Trials | GTA (T1)* | GTA (T2)* | GTA (T3)* | SAT* | SFP* | # of evaluations |
|---|---|---|---|---|---|---|
| 1 | 9 | 12 | 18 | 60 | 1150 | 357 |
| 2 | 9 | 12 | 18 | 60 | 1150 | 470 |
| 3 | 9 | 12 | 18 | 60 | 1150 | 319 |
| 4 | 9 | 12 | 18 | 60 | 1150 | 400 |
| 5 | 8 | 9 | 18 | 60 | 1150 | 310 |
| 6 | 9 | 12 | 18 | 60 | 1150 | 361 |
| 7 | 9 | 12 | 18 | 60 | 1150 | 342 |
| 8 | 9 | 12 | 18 | 60 | 1150 | 390 |
| 9 | 9 | 12 | 18 | 60 | 1150 | 322 |
| 10 | 9 | 12 | 18 | 60 | 1150 | 334 |
| 11 | 9 | 12 | 18 | 60 | 1150 | 432 |
| 12 | 9 | 12 | 18 | 60 | 1150 | 386 |
| 13 | 9 | 12 | 18 | 60 | 1150 | 360 |
| 14 | 9 | 12 | 18 | 60 | 1150 | 366 |
| 15 | 9 | 12 | 18 | 60 | 1150 | 369 |
| 16 | 9 | 12 | 18 | 60 | 1150 | 378 |
| 17 | 9 | 12 | 18 | 60 | 1150 | 422 |
| 18 | 9 | 12 | 18 | 60 | 1150 | 395 |
| 19 | 9 | 12 | 18 | 60 | 1150 | 376 |
| 20 | 9 | 12 | 18 | 60 | 1150 | 347 |
| ES | 9 | 12 | 18 | 60 | 1150 | 5250 |

FIG. 7

Table 4

| Weather Pattern | p(1) | p(2) | p(3) | Ave. # of evaluations |
|---|---|---|---|---|
| 1 | 95% | 95% | 95% | 346 |
| 2 | 95% | 95% | 95% | 372 |
| 3 | 50% | 50% | 95% | 365 |
| 4 | 35% | 35% | 100% | 359 |
| 5 | 75% | 75% | 75% | 379 |
| 6 | 95% | 95% | 100% | 337 |
| 7 | 30% | 70% | 85% | 365 |
| 8 | 35% | 100% | 100% | 356 |
| 9 | 95% | 95% | 95% | 392 |
| 10 | 60% | 60% | 95% | 388 |
| 11 | 80% | 80% | 80% | 381 |
| 12 | 40% | 85% | 85% | 378 |
| 13 | 20% | 70% | 90% | 354 |
| 14 | 10% | 50% | 70% | 352 |
| 15 | 30% | 75% | 100% | 359 |
| 16 | 90% | 100% | 100% | 327 |
| 17 | 100% | 100% | 100% | 337 |
| 18 | 90% | 100% | 100% | 315 |
| 19 | 85% | 100% | 100% | 337 |

FIG. 8

Table 5

| Weather Pattern 2 | | | Weather Pattern 4 | | | Weather Pattern 19 | | |
|---|---|---|---|---|---|---|---|---|
| DR Strategy ID | F | Likelihood Score | DR Strategy ID | F | Likelihood Score | DR Strategy ID | F | Likelihood Score |
| 4823 | 0.4242 | 0.5039 | 4818 | 0.3391 | 0.6667 | 4755 | 0.2926 | 0.6667 |
| 4820 | 0.4246 | 0.2520 | 4817 | 0.3399 | 0.3333 | 4728 | 0.2938 | 0.3333 |
| 4826 | 0.4247 | 0.1260 | | | | | | |
| 4817 | 0.4248 | 0.0630 | | | | | | |
| 4829 | 0.4279 | 0.0315 | | | | | | |
| 4827 | 0.4284 | 0.0157 | | | | | | |
| 4824 | 0.4284 | 0.0079 | | | | | | |

FIG. 9

Table 6

| DR strategy ID | Overall likelihood score | GTA (T1)* | GTA (T2)* | GTA (T3)* | SAT* | SFP* |
|---|---|---|---|---|---|---|
| 4818 | 8.2381 | 9 | 10 | 19 | 60 | 1150 |
| 4755 | 4.2000 | 6 | 7 | 19 | 60 | 1150 |
| 4817 | 2.3963 | 9 | 10 | 18 | 60 | 1150 |
| 4800 | 1.8857 | 8 | 9 | 19 | 60 | 1150 |
| 4728 | 0.6667 | 9 | 6 | 19 | 60 | 1150 |
| 4779 | 0.6095 | 7 | 8 | 19 | 60 | 1150 |
| 4823 | 0.5039 | 9 | 12 | 18 | 60 | 1150 |
| 4820 | 0.252 | 9 | 11 | 18 | 60 | 1150 |
| 4826 | 0.126 | 9 | 13 | 18 | 60 | 1150 |
| 4754 | 0.0667 | 6 | 7 | 18 | 60 | 1150 |
| 4829 | 0.0315 | 9 | 14 | 18 | 60 | 1150 |
| 4827 | 0.0157 | 9 | 13 | 19 | 60 | 1150 |
| 4824 | 0.0079 | 9 | 12 | 19 | 60 | 1150 |

FIG. 10

Table 7

| Sample Day (Pattern) | Algorithm | | | | |
|---|---|---|---|---|---|
| | ES | PBS | GA | OSP | |
| 1 (pattern 19) | 4728 | 4755 | 4728 | 4728 | Opt. DR strategy ID |
| | 5250 | 0 | 288 | 13 | # of on-line evaluations |
| 2 (pattern 3) | 4818 | 4818 | 4818 | 4818 | Opt. DR strategy ID |
| | 5250 | 0 | 349 | 13 | # of on-line evaluations |
| 3 (pattern 9) | 4818 | 4818 | 4818 | 4818 | Opt. DR strategy ID |
| | 5250 | 0 | 358 | 13 | # of on-line evaluations |
| 4 (pattern 8) | 4779 | 4800 | 4755 | 4779 | Opt. DR strategy ID |
| | 5250 | 0 | 362 | 13 | # of on-line evaluations |
| 5 (pattern 14) | 4818 | 4818 | 4779 | 4818 | Opt. DR strategy ID |
| | 5250 | 0 | 380 | 13 | # of on-line evaluations |
| 6 (pattern 13) | 4800 | 4818 | 4800 | 4800 | Opt. DR strategy ID |
| | 5250 | 0 | 383 | 13 | # of on-line evaluations |
| 7 (pattern 16) | 4755 | 4755 | 4755 | 4755 | Opt. DR strategy ID |
| | 5250 | 0 | 308 | 13 | # of on-line evaluations |
| 8 (pattern 8) | 4800 | 4800 | 4755 | 4800 | Opt. DR strategy ID |
| | 5250 | 0 | 311 | 13 | # of on-line evaluations |
| 9 (pattern 18) | 4755 | 4818 | 4755 | 4755 | Opt. DR strategy ID |
| | 5250 | 0 | 326 | 13 | # of on-line evaluations |
| 10 (pattern 18) | 4755 | 4755 | 4755 | 4755 | Opt. DR strategy ID |
| | 5250 | 0 | 311 | 13 | # of on-line evaluations |
| 11 (pattern 17) | 4755 | 4755 | 4755 | 4755 | Opt. DR strategy ID |
| | 5250 | 0 | 339 | 13 | # of on-line evaluations |
| 12 (pattern 14) | 4800 | 4818 | 4779 | 4800 | Opt. DR strategy ID |
| | 5250 | 0 | 361 | 13 | # of on-line evaluations |
| 13 (pattern 16) | 4755 | 4755 | 4755 | 4755 | Opt. DR strategy ID |
| | 5250 | 0 | 323 | 13 | # of on-line evaluations |

FIG. 11

Table 8

| | |
|---:|:---|
| Population size | 50 |
| Creation function | Uniform |
| Scaling function | Rank |
| Selection function | Stochastic Uniform |
| Elite count | 2 |
| Crossover fraction | 0.8 |
| Crossover function | Scattered |
| Mutation function | Uniform with rate=0.3 |
| Maximum generation | 20 |
| Function tolerance | 1.00E-06 |

FIG. 12

Table 9

| pttn | GTA(T1) | GTA(T2) | GTA(T3) | SAT | CWST | CHWST | SFPR | F | Peak Load | # of eval. |
|---|---|---|---|---|---|---|---|---|---|---|
| 1 | 8 | 8 | 18 | 60 | 81 | 41 | 1150 | 0.7174 | 700 | 893 |
| 2 | 9 | 13 | 18 | 60 | 78 | 40 | 1150 | 0.7852 | 742 | 708 |
| 3 | 9 | 10 | 19 | 60 | 81 | 40 | 1150 | 0.7437 | 704 | 805 |
| 4 | 9 | 9 | 19 | 60 | 80 | 41 | 1150 | 0.6896 | 684 | 1052 |
| 5 | 9 | 9 | 18 | 60 | 80 | 41 | 1150 | 0.6821 | 689 | 775 |
| 6 | 8 | 8 | 19 | 60 | 75 | 41 | 1150 | 0.6260 | 626 | 829 |
| 7 | 8 | 8 | 19 | 60 | 76 | 41 | 1150 | 0.6329 | 643 | 780 |
| 8 | 9 | 9 | 19 | 60 | 75 | 40 | 1150 | 0.5762 | 620 | 852 |
| 9 | 9 | 12 | 19 | 60 | 76 | 40 | 1150 | 0.6005 | 653 | 925 |
| 10 | 9 | 9 | 19 | 60 | 76 | 40 | 1150 | 0.6002 | 656 | 827 |
| 11 | 9 | 9 | 19 | 60 | 77 | 40 | 1150 | 0.6216 | 668 | 830 |
| 12 | 8 | 8 | 19 | 60 | 76 | 40 | 1150 | 0.6208 | 660 | 916 |
| 13 | 8 | 8 | 19 | 60 | 75 | 40 | 1150 | 0.6051 | 625 | 954 |
| 14 | 8 | 8 | 19 | 60 | 75 | 41 | 1150 | 0.5605 | 613 | 801 |
| 15 | 7 | 7 | 19 | 60 | 75 | 41 | 1150 | 0.5443 | 616 | 954 |
| 16 | 7 | 7 | 19 | 60 | 77 | 41 | 1200 | 0.5849 | 586 | 1323 |
| 17 | 7 | 7 | 19 | 60 | 75 | 40 | 1150 | 0.6111 | 606 | 769 |
| 18 | 7 | 7 | 19 | 60 | 75 | 41 | 1150 | 0.5314 | 583 | 824 |
| 19 | 7 | 7 | 19 | 60 | 75 | 40 | 1150 | 0.5767 | 573 | 840 |

FIG. 13

Table 10

| | | Algorithm | PBS | GA | OSP |
|---|---|---|---|---|---|
| Sample Day | 1 (pattern 19) | Opt. DR strategy | [7,7,19,60,75,40,1150] | [7,7,19,60,75,41,1150] | [7,7,19,60,76,40,1150] |
| | | # of eval. | 0 | 785 | 97 |
| | | f | 0.5858 | 0.5858 | 0.5858 |
| | 2 (pattern 3) | Opt. DR strategy | [9,10,19,60,81,40,1150] | [9,9,19,60,80,40,1150] | [9,9,19,60,80,41,1150] |
| | | # of eval. | 0 | 887 | 97 |
| | | f | 0.7008 | 0.6923 | 0.6923 |
| | 3 (pattern 9) | Opt. DR strategy | [9,12,19,60,76,40,1150] | [9,12,19,60,76,40,1150] | [9,12,19,60,76,40,1150] |
| | | # of eval. | 0 | 1130 | 97 |
| | | f | 0.6063 | 0.6063 | 0.6063 |
| | 4 (pattern 8) | Opt. DR strategy | [8,8,19,60,75,40,1150] | [8,8,19,60,75,40,1150] | [9,9,19,60,75,40,1150] |
| | | # of eval. | 0 | 815 | 97 |
| | | f | 0.5899 | 0.5899 | 0.5886 |
| | 5 (pattern 14) | Opt. DR strategy | [8,8,19,60,75,40,1200] | [8,8,19,60,75,40,1150] | [9,9,19,60,75,40,1150] |
| | | # of eval. | 0 | 794 | 97 |
| | | f | 0.5669 | 0.5639 | 0.5608 |
| | 6 (pattern 13) | Opt. DR strategy | [7,7,19,60,75,41,1150] | [8,9,19,60,75,40,1150] | [9,9,19,60,75,40,1150] |
| | | # of eval. | 0 | 794 | 97 |
| | | f | 0.6060 | 0.6080 | 0.6016 |
| | 7 (pattern 16) | Opt. DR strategy | [6,6,19,60,75,41,1150] | [8,8,19,60,75,40,1150] | [7,7,19,60,75,40,1150] |
| | | # of eval. | 0 | 876 | 97 |
| | | f | 0.5973 | 0.5961 | 0.5961 |
| | 8 (pattern 8) | Opt. DR strategy | [8,8,19,60,75,40,1150] | [7,7,19,60,75,40,1150] | [9,9,19,60,75,40,1150] |
| | | # of eval. | 0 | 817 | 97 |
| | | f | 0.5956 | 0.5977 | 0.5930 |
| | 9 (pattern 18) | Opt. DR strategy | [7,7,19,60,75,40,1150] | [7,7,19,60,75,40,1150] | [7,7,19,60,75,40,1150] |
| | | # of eval. | 0 | 825 | 97 |
| | | f | 0.5385 | 0.5385 | 0.5386 |
| | 10 (pattern 18) | Opt. DR strategy | [7,7,19,60,75,40,1150] | [8,8,19,60,75,40,1150] | [8,8,19,60,75,41,1150] |
| | | # of eval. | 0 | 765 | 97 |
| | | f | 0.5296 | 0.5295 | 0.5295 |
| | 11 (pattern 17) | Opt. DR strategy | [7,7,19,60,75,41,1150] | [6,6,19,60,75,40,1150] | [9,9,19,60,75,40,1150] |
| | | # of eval. | 0 | 829 | 97 |
| | | f | 0.5798 | 0.5816 | 0.5792 |
| | 12 (pattern 14) | Opt. DR strategy | [8,8,19,60,75,40,1200] | [8,8,19,60,75,40,1150] | [9,9,19,60,75,40,1150] |
| | | # of eval. | 0 | 980 | 97 |
| | | f | 0.5570 | 0.5541 | 0.5520 |
| | 13 (pattern 16) | Opt. DR strategy | [6,6,19,60,75,41,1150] | [7,7,19,60,75,40,1150] | [7,7,19,60,75,40,1150] |
| | | # of eval. | 0 | 751 | 97 |
| | | f | 0.5683 | 0.5674 | 0.5674 |

FIG. 15

ON-LINE OPTIMIZATION SCHEME FOR HVAC DEMAND RESPONSE

CROSS REFERENCE TO RELATED UNITED STATES APPLICATIONS

This application claims priority from "A Two-Stage Simulation-Based On-Line Optimization Scheme For HVAC Demand Response", U.S. Provisional Application No. 61/712,494 of Lu, et al., filed Oct. 11, 2012, the contents of all of which are herein incorporated by reference in their entireties.

The invention was made with government support under Award Number DE-EE0003847 awarded by the Department of Energy. The government has certain rights in the invention.

TECHNICAL FIELD

This disclosure is directed to optimization methods for heating, ventilation and air conditioning systems in buildings.

DISCUSSION OF THE RELATED ART

On-line control optimization for building heating, ventilation and air conditioning (HVAC) systems is crucial for automatic demand response. Simulation-based optimization techniques usually require intensive computation, even with advanced optimization algorithms, and therefore are not feasible for on-line decision making. The demand response (DR) control strategies of HVAC systems in buildings, especially commercial buildings with medium to large spaces, have been studied by many groups using analytic, simulation and field approaches. Advanced controls of thermostat setpoints and HVAC equipment operations have been developed to reduce the building peak load. The application of building automation systems enables the real-time assessment of HVAC performance data, load status, weather condition/forecast and DR signals. It also allows immediate or scheduled execution of control directives. As a result, on-line control optimization that responds to the building dynamics and weather changes becomes possible.

There are two approaches to developing an optimal control strategy for building HVAC system: one is based on simulation and the other attempts to directly solve optimization equations. The first approach relies on whole building simulation engines. With inputs of building geometry, building envelope, internal loads, HVAC systems and weather data, simulation engines can compute energy consumption using physical or approximate equations. Various optimizers can be involved to select optimal strategies. This simulation-based approach can provide acceptable accuracy, but requires much engineering effort to develop and calibrate the simulation model for each specific building, and the computation load is heavy.

The second approach attempts to model building energy consumption in such manner that, given certain objective functions and constraints, the optimal solution can be solved directly, without simulation. This approach has (1) a relatively low computation load, and therefore, is capable of quick responds; (2) one generic model may apply to different buildings; and (3) the prediction accuracy can improve over time, if machine learning is employed. But this approach is challenging in both a modeling phase, because of the complexity of the system, and in an optimization phase, due to nonlinearities and the continuous-discrete nature.

SUMMARY

Exemplary embodiments of the present disclosure as described herein generally include methods for a two-stage scheme to perform on-line simulation-based HVAC DR control optimization. In an off-line stage according to an embodiment of the disclosure, computationally intensive optimizations are performed for weather patterns identified from historical weather data. Based on results from the off-line stage, an optimal strategy pool knowledge base can be generated, which may contain optimal DR strategies for any daily weather profile with high probability. This knowledge base will be used with an on-line simulation-based optimization. In a second stage according to an embodiment of the disclosure, a simulation evaluation for each candidate strategy in the knowledge base can identify a best strategy. Experimental results of an embodiment of the disclosure show that this best strategy is likely to be an optimal HVAC control strategy for the planning day. In a case study of Sutardja Dai Hall at the University of California, Berkeley, headquarters of the Center for Information Technology Research in the Interest of Society (CITRIS), an approach according to an embodiment of the disclosure can identify an optimal strategy for all 13 sample days, with significantly fewer simulation evaluations. In addition, an optimal strategy can reduce the HVAC peak load by 18% for a typical hot August day in Berkeley, Calif.

According to an aspect of the disclosure, there is provided a computer-implemented method of optimizing demand-response (DR) of a heating, ventilation, and air-conditioning (HVAC) system of a building, including determining a value of an objective function $F_{ij}$ of a HVAC system for each of a plurality of DR strategies j for each of a plurality of weather patterns i that is a weighted sum of an energy cost of the HVAC system and a thermal comfort loss of the HVAC system, assigning a likelihood score $L_{i,j}$ to each of a selected subset of near-optimal DR strategies j for each weather pattern i, and selecting those near-optimal DR strategies with large overall likelihood scores $L_j$ to create an optimal strategy pool of DR strategies, where the optimal strategy pool can be searched in real-time for an optimal DR strategy for a given weather pattern.

According to a further aspect of the disclosure, the method includes performing a simulation of each of the plurality of DR strategies for each of the plurality of weather patterns to determine an hourly energy usage of the HVAC system and an hourly predicted percent dissatisfied (PPD) score of the HVAC system, calculating the energy cost from the hourly energy usage using a time-of-use price model, and calculating the thermal comfort loss by summing the PPD scores for occupied building zones over a 24 hour period.

According to a further aspect of the disclosure, the objective function $F_{ij}$ of a HVAC system for each of a plurality of DR strategies for each of a plurality of weather patterns is calculated from $$F_{i,j} = w_C \frac{C_{i,j} - C_{min}}{C_{max} - C_{min\square}} + w_U \frac{U_{i,j} - U_{min}}{U_{max} - U_{min\square}},$$

where $C_{ij}$ and $U_{ij}$ are the energy cost and the thermal comfort loss, respectively, $C_{min}$ and $U_{min}$, are the minimum energy cost and the thermal comfort loss, respectively, $C_{max}$ and $U_{max}$ are the maximum energy cost and the thermal comfort loss, respectively, and $w_c$ and $w_u$ are predetermined respective energy cost and thermal comfort loss weights.

According to a further aspect of the disclosure, determining a selected subset of near-optimal DR strategies j for each weather pattern i includes sorting the DRs for each weather pattern in ascending order of the objective function $F_{ij}$, where $j^k$ is a k-th strategy in a sorted list of DR strategies, finding a DR for each weather pattern $F_i^*$ that is a minimum for all DR's j for the weather pattern i, and selecting those DR's j for which $F_{i,j} \leq \alpha F_i^*$ for a pre-determined positive threshold $\alpha$.

According to a further aspect of the disclosure, the likelihood score $L_{i,j^k}$ of each of the selected subset of near-optimal DR strategies $j^k$ for each weather pattern i is determined according to $$\sum_{k=1}^{N_i} L_{i,j^k} = 1 \text{ and } \frac{L_{i,j^{k+1}}}{L_{i,j^k}} = \beta,$$

where $N_i$ is a total number of selected strategies for each weather pattern i, k=1, 2, . . . , $N_i$-1, and $\beta$ is a predetermined ratio.

According to a further aspect of the disclosure, the method includes determining an overall likelihood score $L_j$ of DR strategy j for all weather patterns from $$L_j = \sum_{i=1}^{I} p_i L_{i,j},$$

where I is a total number of weather patterns, and $p_i$ is a probability that the weather of a particular day is of pattern i.

According to a further aspect of the disclosure, the method includes estimating $p_i$ by dividing a number of pattern i days by a total number of recorded days.

According to another aspect of the disclosure, there is provided a computer-implemented method of optimizing demand-response (DR) of a heating, ventilation, and air-conditioning (HVAC) system of a building, including sorting a plurality of DRs j for each of a plurality of weather patterns i in ascending order of an objective function $F_{ij}$ value, where $j^k$ is a k-th strategy in a sorted list of DR strategies, finding a DR for each weather pattern $F_i^*$ that is a minimum for all DR's j for the weather pattern i, selecting those DR's j for which $F_{i,j} \leq \alpha F_i^*$ for a pre-determined positive threshold $\alpha$, and selecting those near-optimal DR strategies with large overall likelihood scores $L_j$ to create an optimal strategy pool of DR strategies, where the optimal strategy pool can be searched in real-time for an optimal DR strategy for a given weather pattern.

According to a further aspect of the disclosure, the method includes assigning a likelihood score $L_{i,j^k}$ to each of a selected subset of near-optimal DR strategies j for each weather pattern i where $$\sum_{k=1}^{N_i} L_{i,j^k} = 1 \text{ and } \frac{L_{i,j^{k+1}}}{L_{i,j^k}} = \beta,$$

where $N_i$ is a total number of selected strategies for each weather pattern i, k=1, 2, . . . , $N_i$-1, and $\beta$ is a pre-determined ratio.

According to a further aspect of the disclosure, the method includes determining an overall likelihood score $L_j$ of DR strategy j for all weather patterns from $$L_j = \sum_{i=1}^{I} p_i L_{i,j},$$

where I is a total number of weather patterns, and $p_i$ is a probability that the weather of a particular day is of pattern i.

According to a further aspect of the disclosure, the method includes performing a simulation of each of the plurality of DR strategies for each of the plurality of weather patterns to determine an hourly energy usage of the HVAC system and an hourly predicted percent dissatisfied (PPD) score of the HVAC system, calculating the energy cost from the hourly energy usage using a time-of-use price model, and calculating the thermal comfort loss by summing the PPD scores for occupied building zones over a 24 hour period.

According to a further aspect of the disclosure, the objective function $F_{ij}$ of a HVAC system for each of a plurality of DR strategies for each of a plurality of weather patterns is calculated from $$F_{i,j} = w_C \frac{C_{i,j} - C_{min}}{C_{max} - C_{min}} + w_U \frac{U_{i,j} - U_{min}}{U_{max} - U_{min}},$$

where $C_{ij}$ and $U_{ij}$ are the energy cost and the thermal comfort loss, respectively, $C_{min}$ and $U_{min}$ are the minimum energy cost and the thermal comfort loss, respectively, $C_{max}$ and $U_{max}$ are the maximum energy cost and the thermal comfort loss, respectively, and $w_c$ and $w_u$ are predetermined respective energy cost and thermal comfort loss weights.

According to a further aspect of the disclosure, the method includes determining a value of the objective function $F_{ij}$ of a HVAC system for each of a plurality of DR strategies j for each of a plurality of weather patterns i that is a weighted sum of an energy cost of the HVAC system and a thermal comfort loss of the HVAC system.

According to another aspect of the disclosure, there is provided a non-transitory program storage device readable by a computer, tangibly embodying a program of instructions executed by the computer to perform the method steps for optimizing demand-response (DR) of a heating, ventilation, and air-conditioning (HVAC) system of a building.

BRIEF DESCRIPTION OF THE DRAWINGS

FIG. 5 is a table of results for Optimization by Exhaustive Search, according to an embodiment of the disclosure.

FIG. 6 is a table of GA parameters, according to an embodiment of the disclosure.

FIG. 7 is a table of GA results for weather pattern 2, according to an embodiment of the disclosure.

FIG. 8 is a table of GA success rates and efficiency, according to an embodiment of the disclosure.

FIG. 9 is a table illustrating optimal and near-optimal DR strategy selection, according to an embodiment of the disclosure.

FIG. 10 is a table illustrating an optimal strategy pool, according to an embodiment of the disclosure.

FIG. 11 is a table that illustrates a validation of an Optimal Strategy Pool, according to an embodiment of the disclosure.

FIG. 12 is a table of GA configuration parameters, according to an embodiment of the disclosure.

FIG. 13 is a table of GA optimization results, according to an embodiment of the disclosure.

FIG. 15 is a table comparing results of a PBS, a GA and an OSP, according to an embodiment of the disclosure.

DETAILED DESCRIPTION OF EXEMPLARY EMBODIMENTS

Figure 1:
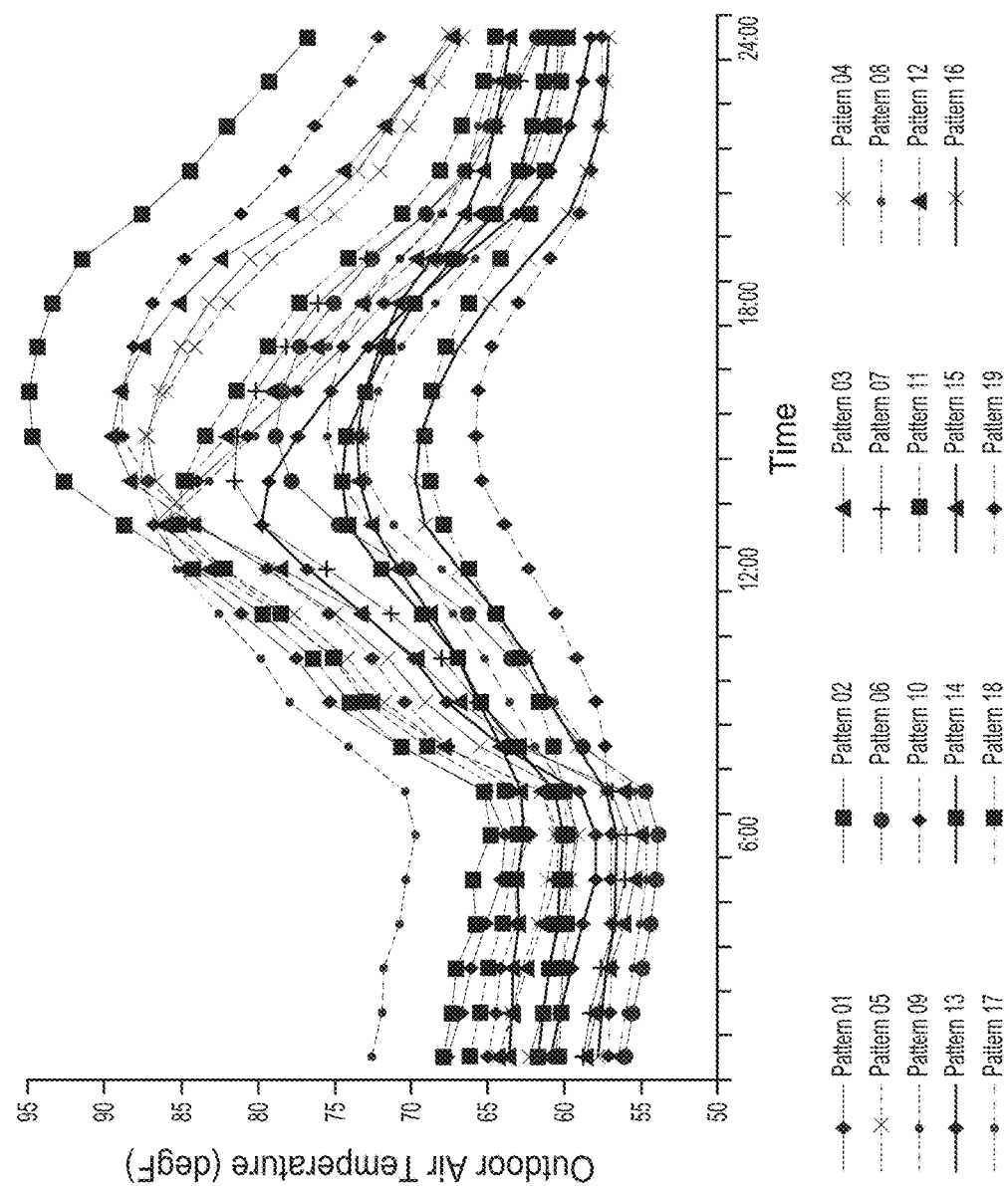
FIG. 1 depicts August daily weather patterns in Berkeley, Calif., according to an embodiment of the disclosure.

Exemplary embodiments of the disclosure as described herein generally include systems and methods for a two-stage HVAC demand-response optimization scheme. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Exemplary embodiments of the disclosure provide a simulation-based HVAC control optimization scheme. An optimization scheme according to an embodiment of the disclosure may include two stages: an off-line optimization and an on-line optimization. An off-line stage according to an embodiment of the disclosure uses exhaustive search or other algorithms with detailed energy simulations, and optimal and several near-optimal strategies can be identified for each typical daily weather pattern. The top choices may be selected for all weather patterns to generate an optimal strategy pool. An on-line stage according to an embodiment of the disclosure can, upon availability of a weather forecast, evaluate all optimal strategy pool candidates, and can identify an optimal strategy within a relatively short time. A two-stage scheme optimal strategy pool performs computationally intensive optimization off-line, which can reduce the computation load for an on-line generation of optimal DR strategy, while (near-) optimal performance can be achieved.

A healthy and productive indoor environment should also be considered when DR control strategies are studied. According to an embodiment of the disclosure, to quantitatively evaluate indoor thermal comfort, the Predicted Mean Vote (PMV) model and its derivation, Predicted Percent Dissatisfied (PPD) model may be used. A PMV/PPD model relates deviation from optimal thermal conditions to whole body metabolic effector phenomena, such as sweating and vessel dilation, and with occupants' comfort vote. Besides temperature, PMV/PPD model takes ventilation rate, mean radiant temperature and relative humidity, as well as clothing insulation and activity level, into consideration. PMV is scaled to predict occupant sensation vote on a seven-point scale: from hot to neutral, and then to cold. PPD is actually determined by PMV, and has range of values from 5% (PMV=neutral) to 100% (PMV=hot or cold). It should be understood, however, that any alternative modeling approach can be used by other embodiments of the disclosure to incorporate indoor thermal comfort evaluation in the optimization objective.

Methods

A detailed simulation model was developed for Sutardja Dai Hall at the University of California, Berkeley campus, which is a large education facility with 7 floors and a total of 141,000 square feet of conditioned area that hosts research labs, offices, auditoriums, etc. There are 135 zones, 6 Air Handling Units (AHUs), 110 Variable Air Volume (VAV) terminals, 1 centrifugal chiller, 1 absorption chiller, 2 cooling towers and other HVAC components in the simulation model. All HVAC equipments are operating with 24×7 schedules. The internal gains, equipment operations and controls are modeled, and a system component-based calibration methodology is employed. The occupancy schedules are based on a field survey; office rooms are occupied from 8:00 to 21:00 each day. The lighting and plug loads are calibrated using data from dedicated sub-meters on each floor, and HVAC component performance curves are derived based on trending data, which is obtained from the building automation system. If simulation time step is 15 minutes, the difference between simulated and measured monthly energy of the building is within 10%, and is less than 20% for hourly time steps.

According to the operation schedule, the absorption chiller works only in summers and the centrifugal chiller only in winters. As a study according to an embodiment of the disclosure focuses on DR in summer, the absorption chiller electric power is the only chiller consumption counted in optimization; centrifugal chiller electric power and absorption chiller steam consumption are not considered. In addition, there are two AHUs supplying air to office spaces in the building. The other four AHUs are dedicated for other tasks, such as a nano-fabrication laboratory. In a study according to an embodiment of the disclosure, only the HVAC systems for office part are controllable, but energy consumption is calculated for all HVAC systems in the building, because all AHUs share the same plant equipment, and it is challenging to separate the plant loop energy consumption for offices from the non-office part.

A study according to an embodiment of the disclosure may be implemented on any suitable simulation platform. An exemplary, non-limiting simulation platform is a Matlab/EnergyPlus co-simulation platform that uses the external interface functionality of EnergyPlus, and establishes bidirectional communication between EnergyPlus and Matlab. Energy simulation and Matlabscript execution are synchronized so that at each simulation time step, Matlab can collect the performance data, such as meter readings, from EnergyPlus, and generate control actions for the simulation. A Genetic Algorithm implemented by Matlab Global Optimization Toolbox was also used for a benchmark comparison with an algorithm according to an embodiment of the disclosure.

Historical August weather data of Berkeley, Calif. for the years between 2002 and 2010 has been collected. For each August day, the hourly dry bulb temperature and its simulated baseline peak load are included in the feature space, and subject to dimension reduction by principal component analysis (PCA), after which K– means clustering is applied. In a study according to an embodiment of the disclosure, at least 19 clusters are used to ensure the variance in each cluster is lower than a pre-determined threshold. The centroid weather profile of each cluster is then obtained by taking average over all member profiles. All 19 centroid August weather profiles are depicted in FIG. 1. Pattern 2, 4 and 19 are selected as the typical hot, mild and cool August weather pattern, respectively, for results presentation.

A first study according to an embodiment of the disclosure considers global temperature setpoint adjustment (GTA), supply air temperature setpoint (SAT), and supply fan pressure setpoint (SFP), and the optimization decision variables are the start/end time of the pre-cooling period (T1 and T2 in FIG. 2), the end time of the exponential reset period (T3 in FIG. 2), and the setpoints for the supply air temp and supply fan pressure. Certain constraints apply, which are detailed as follows.

Figure 2:
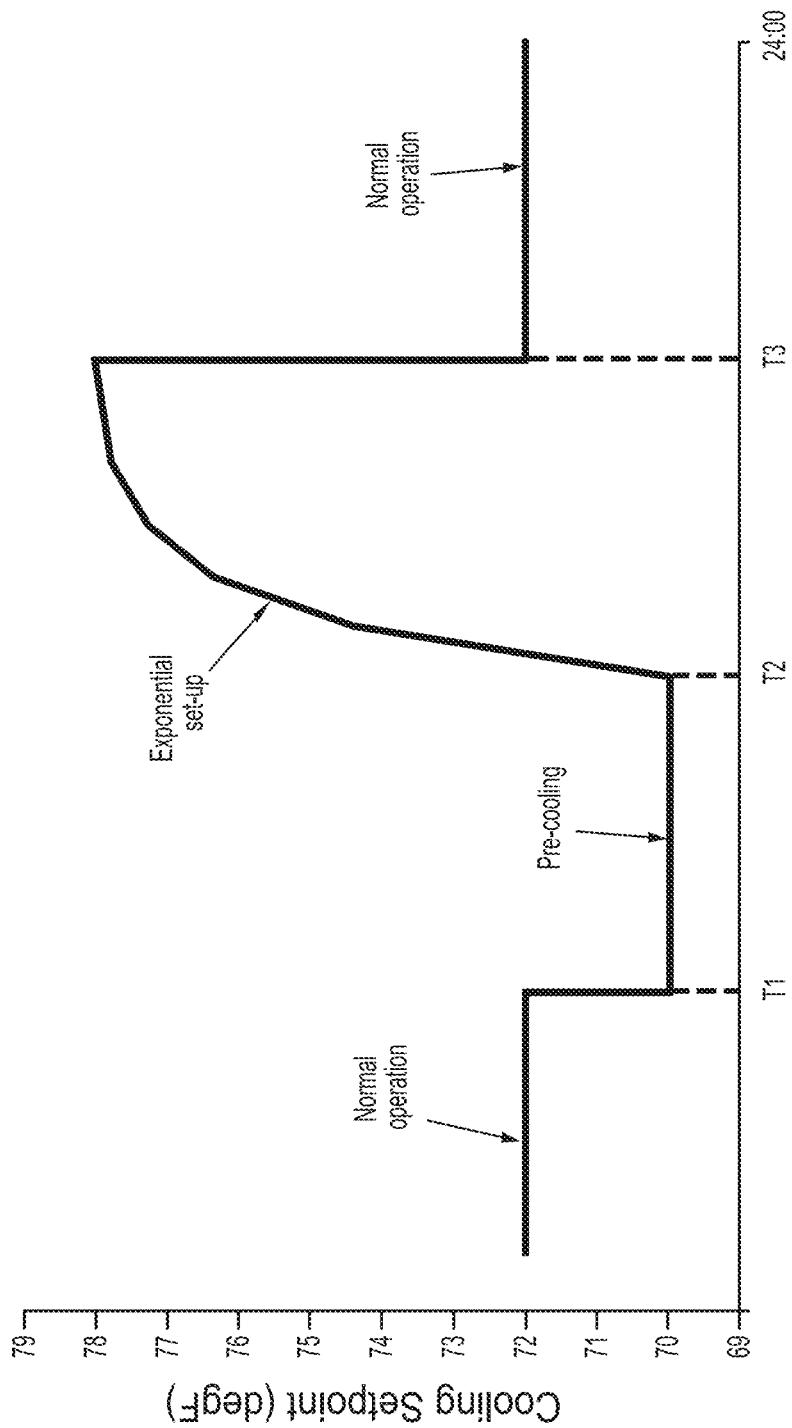
FIG. 2 illustrates a GTA strategy diagram according to an embodiment of the disclosure.

GTA:

The cooling setpoints of all zones are subject to change throughout the day. A pre-cooling and exponential set-up strategy is applied. As depicted in FIG. 2, between 0:00 and T1, the cooling setpoint is set at the current baseline value, which is 72° F. (normal operation); between T1 and T2, the cooling setpoint is set at 70° F. (pre-cooling); between T2 and T3, the cooling setpoint is set up exponentially to 78° F. (exponential set-up); and between T3 and 24:00, the cooling setpoint is set back to 72° F. (normal operation). All zones use the same GTA strategy. To reduce the size of a solution space, only the three time points (i.e., T1, T2 and T3) are considered as decision variables. The setpoint values at T1, T2 and T3 are fixed at 72° F., 70° F. and 78° F., respectively. Furthermore, time points can only be integer hours within the following ranges: $5 \leq T1 \leq 9$, $T1 < T2 \leq 14$, and $17 \leq T3 \leq 19$.

SAT: There are two AHUs dedicated for office spaces. These AHUs are controlled by the same SAT setpoint, whose current value is 56° F.; and share the same supply air duct. SAT setpoint values between 51 and 60° F. are explored, with an interval of 1° F. A study according to an embodiment of the disclosure assumes that the SAT setpoints only change at the beginning of the DR day, to simplify a simulation.

SFP:

The two supply fans (SF-2A and SF-2B) in the building are variable volume fans. The operation speed is controlled by a proportional-integral-derivative controller (PID controller) that maintains the fan pressure at a fixed setpoint, which is currently 1350 Pa. SFP setpoint values between 1150 Pa and 1350 Pa are explored, with an interval of 50 Pa. Again, to reduce the simulation complexity, a simulation according to an embodiment of the disclosure assumes that SFP setpoints are changed at the beginning of the DR day.

A DR strategy according to an embodiment of the disclosure may be defined by five decision variables: GTA(T1), GTA(T2), GTA(T3), SAT and SFP. The total number of strategies is 5250.

Another study according to embodiments of the disclosure considers water-side controls in DR. Two more controllable points, condenser water supply temperature setpoints (CWST) and chilled water supply temperature setpoints (CHWST) can be chosen to control the water-side system. According to an embodiment of the disclosure, CWST has its baseline at 25.8° C. (78.4° F.) and CHWST's baseline is 10° C. (50° F.). Adding these two decision variables increased the solution space from 5-dimensional to 7-dimensional, and the of candidate strategies increased from 5000+ to 700000+. Other models according to embodiments of the disclosure can also include performance curves of the electric centrifugal chiller based on measured data, such as a cooling capacity as function of temperature curve, an electric input to cooling output ratio as function of temperature curve, and an electric input to cooling output ratio as function of part load ratio cure.

Optimization

Figure 3:
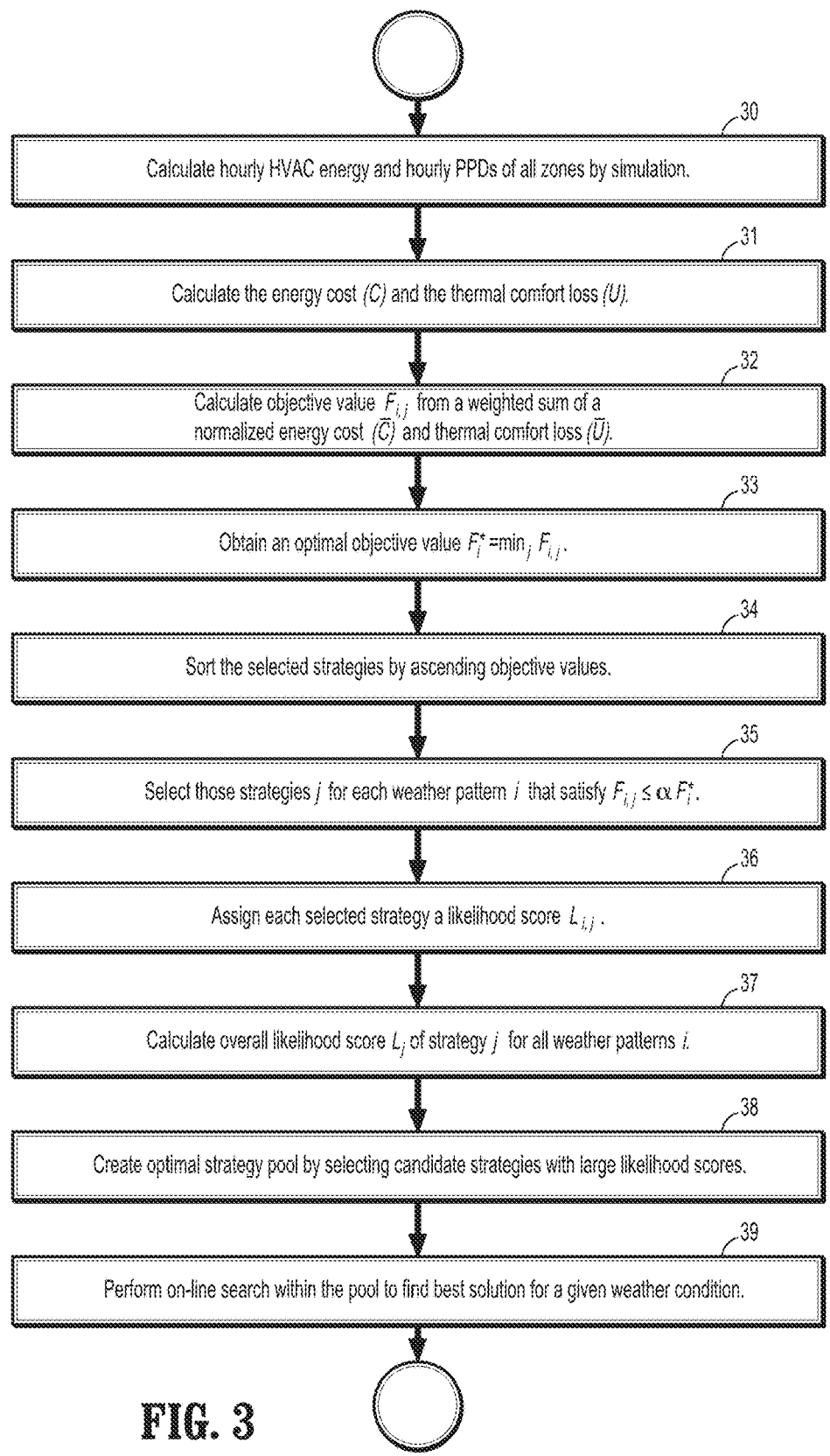
FIG. 3 is a flowchart of a method for a two-stage HVAC demand-response optimization scheme, according to an embodiment of the disclosure.

An optimization according to an embodiment of the disclosure may be described as follows, with reference to the flowchart of FIG. 3.

Figure 4:
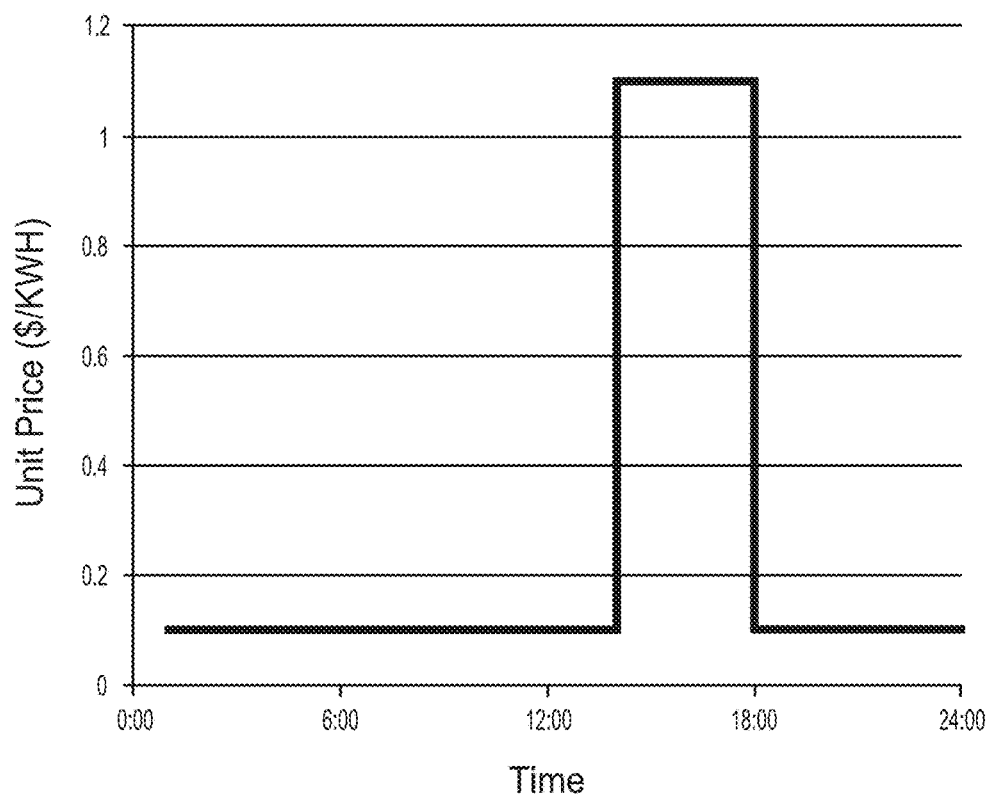
FIG. 4 illustrates a simplified peak day price model according to an embodiment of the disclosure.

For any weather pattern i, a DR strategy j may be evaluated by a simulation. A simulation according to an embodiment of the disclosure may evaluate 19 weather patterns for 5250 DR strategies, however, other simulations may evaluate a different number of weather patterns with a different number of DR strategies. At step 30, the hourly HVAC energy and hourly PPDs of all zones can be calculated by a simulation. The daily energy cost (C) may be calculated at step 31 using any time-of-use pricing model. An exemplary, non-limiting pricing model is a simplified peak day price model (PDP), depicted in FIG. 4. Similarly, the thermal comfort loss (U) may be calculated at step 31 using any appropriate quantitative model. An exemplary, non-limiting calculation sums the 24-hour PPD values of the occupied zones. After a min-max normalization, an objective value $F_{i,j}$ can be calculated at step 32 from a weighted sum of the normalized energy cost and the normalized thermal comfort loss, as expressed by EQ. (1):

$$F_{i,j} = w_C \frac{C_{i,j} - C_{min}}{C_{max} - C_{min}} + w_U \frac{U_{i,j} - U_{min}}{U_{max} - U_{min}}, \quad (1)$$

where $w_c$ and $w_u$ are predetermined respective energy cost and thermal comfort loss weights. Note that the objective function defined by EQ. (1) is exemplary and non-limiting, and other formulations may be used in other embodiments of the disclosure. An exhaustive search (ES) and other optimization algorithms may be applied at step 33 to obtain an optimal objective value that represents an optimal DR for each weather pattern i:

$$F_i^* \min_{j} F_{i,j}.$$

The DR strategies for each weather pattern are sorted by ascending objective function values, at step 34.

During a first stage according to an embodiment of the disclosure, for each weather pattern i, strategy j will be selected at step 35 if it satisfies EQ. (2):

$$F_{i,j} \leq \alpha F_i^*, \quad (2)$$

where α is the pre-determined threshold. An exemplary, non-limiting value of α is 1.1. Denote the total number of selected strategies for each weather pattern i by $N_i$. Let $j^k$ be the k-th strategy in this rank, where $k=1, 2, 3, \ldots, N_i$. At step 36, each selected strategies may be assigned a likelihood score (L) that may be determined by EQS. (3) and (4):

$$\sum_{k=1}^{N_i} L_{i,j^k} = 1, \quad (3)$$

$$\frac{L_{i,j}^{k+1}}{L_{i,j}^{k}} = \beta, k = 1, 2, \ldots, N_i - 1, \quad (4)$$

where β is a pre-determined ratio. An exemplary, non-limiting value of β is 0.5. At step 37, an overall likelihood score of strategy j for all weather patterns is calculated, as expressed by EQ. (5):

$$L_j = \sum_{i=1}^{I} p_i L_{i,j}, \quad (5)$$

where I is a total number of weather patterns, $p_i$ is a probability that the weather of the planning day is of pattern i. $p_i$ can be estimated by dividing the number of pattern i days in the record by the total number of recorded days.

An optimal strategy pool according to an embodiment of the disclosure can be created at step 38 by selecting candidate strategies with large overall likelihood scores. As this pool will contain a smaller number of candidate strategies, an exhaustive search within the pool can provide a best solution for a given weather condition, and this search can be conducted on-line in real-time at step 39.

Off-Line Evaluations

During an off-line stage of a first experiment according to an embodiment of the disclosure, the evaluations of 5250 DR strategies are performed for 19 centroid weather profiles, to establish a "ground truth". The results are summarized in Table 1, shown in FIG. 5. One exemplary, non-limiting DR evaluation algorithm is an exhaustive search optimization. The use of other optimization algorithms will be discussed below.

Another exemplary, non-limiting DR evaluation algorithm is a genetic algorithm (GA), which may be used in situations when solution space is so large that exhaustive search is infeasible. Adding to the previous GTA, SAT and SFPR controls according to embodiments of the disclosure, water-side simulations according to embodiments of the disclosure may include CWST and CHWST. CWST is integer value between 75 and 81 (° F.), and CHWST is integer value between 40 and 60 (° F.). With two more dimensions, a search space according to embodiments of the disclosure expands from 5250 candidate solutions to over 700,000. Even with a faster simulation model, a complete exploration of the search space may not be practical. As a result, according to embodiments of the disclosure, the establishment of a ground truth optimal solution may be accomplished with evolutionary algorithms, such as a GA. A GA optimization configuration according to embodiments of the disclosure is summarized in Table 8 of FIG. 12, and the results are summarized in Table 9 of FIG. 13.

On-Line Optimization

A Genetic Algorithm (GA) was applied as an alternative method according to an embodiment of the disclosure for off-line optimization, and may be used by embodiments of the disclosure for on-line optimization. The Global Optimization Toolbox provided in Matlab is employed. The GA parameters are summarized in Table 2, shown in FIG. 6.

For each weather pattern, a GA is tested with 20 repeats. Optimal strategies for weather pattern 2 obtained in all 20 tests are summarized in Table 3, shown in FIG. 7. According to this result, in 19 out of 20 (95%) GA trials, an optimal DR strategy can be obtained, and the average number of simulation evaluations is 372. Similar results can be obtained for all 19 weather patterns. These results are presented in Table 4, shown in FIG. 8. In FIG. 8, p(1) represents a probability of obtaining an optimum, p(2) represents a probability of obtaining an optimum or a 2nd best, and p(3) represents a probability of obtaining an optimum, a 2nd or a 3rd best. In general, by applying a GA, an optimum is not guaranteed, but the probability of obtaining the top 3 DR strategies is high, while the calculation load is reduced by nearly 93%.

Optimal Strategy Pool

After evaluating all 5250 DR strategies for all 19 centroids, the top strategies are selected using a mechanism described above according to an embodiment of the disclosure. Table 5, shown in FIG. 9, presents the selected strategies and their corresponding likelihood scores for weather patterns 2, 4 and 19. The overall likelihood scores are calculated, and only 13 strategies have non-zero scores. These 13 strategies constitute an optimal strategy pool, which is displayed in Table 6 of FIG. 10.

To validate an optimal strategy pool algorithm (OSP) according to an embodiment of the disclosure, 13 historical August days for Berkeley, Calif. are randomly sampled for testing. The results of an OSP according to an embodiment of the disclosure are compared with an ES optimization according to an embodiment of the disclosure and other two on-line optimization algorithms: a GA and a pattern based strategy selection (PBS). The optimal DR strategies obtained by each algorithm as well as total number of evaluations are presented in Table 7, shown in FIG. 11.

By applying PBS, an optimal strategy for a sample weather is assumed to be the same for the weather pattern to which it belongs. PBS does not require on-line simulation evaluation of DR strategies, therefore, it seems to be adapted to on-line optimization. However, according to result of an embodiment of the disclosure, the PBS algorithm fails to identify the optimal strategy for Sample Days 1, 4, 6, 9 and 12. A GA performs slightly better, as it fails for Sample Days 4, 5, 8 and 12. On the other hand, an OSP according to an embodiment of the disclosure can identify an optimal DR strategy for all sample days. Furthermore, an OSP according to an embodiment of the disclosure uses 13 on-line simulation evaluations, which is 3.5% of evaluations performed by a GA, and 0.2% of evaluations performed by an ES. It takes about 2 minutes to finish one simulation execution on a personal PC laptop, which implies that an ES would need 7.3 days, a GA would need 12 hours, but an OSP according to an embodiment of the disclosure can obtain an optimal DR strategy for a given weather profile in less than 30 minutes.

Figure 14:
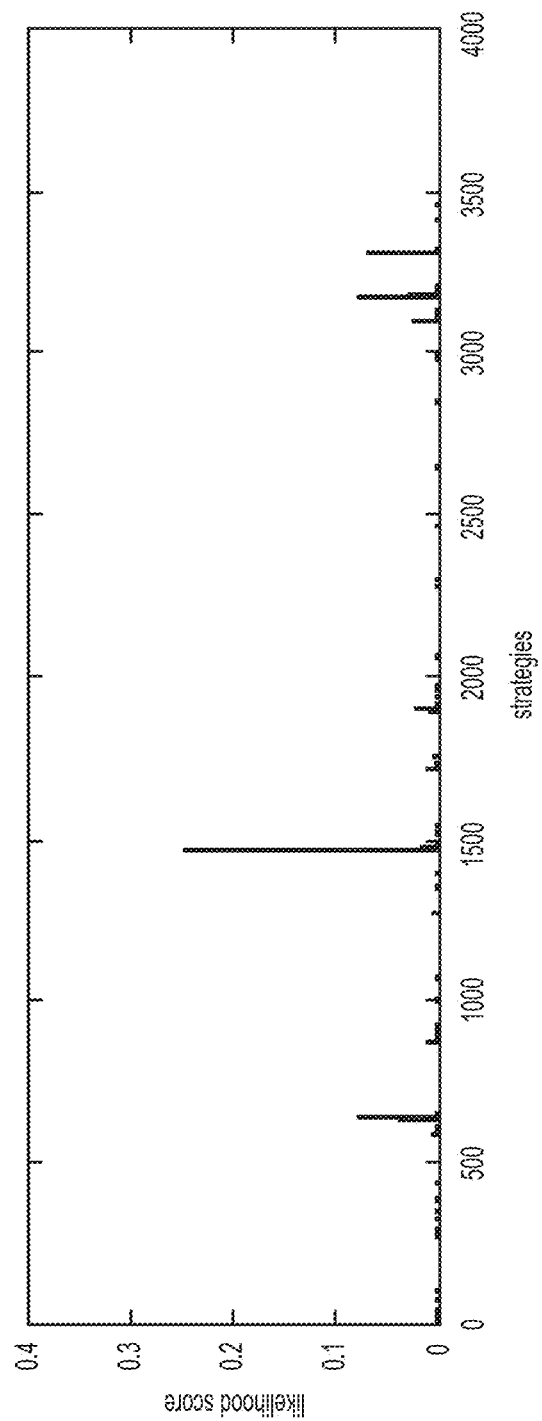
FIG. 14 illustrates a strategy likelihood spectrum, according to an embodiment of the disclosure.

A GA optimization according to embodiments of the disclosure uses about 877 simulation evaluations, on average, to identify an optimal strategy. This may take up to 10 hours on a laptop computer. To find an algorithm that can achieve the same goal within 1 hour, an optimal strategy pool (OSP) according to embodiments of the disclosure was used to aggregate several of the best strategies based on likelihood scores. FIG. 14 illustrates a strategy likelihood spectrum, according to an embodiment of the disclosure. As shown in FIG. 14, 97 spikes can be identified from a strategy likelihood spectrum according to embodiments of the disclosure, which represent 97 strategies to be incorporated into an optimal strategy pool (OSP) according to embodiments of the disclosure.

To validate an OSP algorithm according to embodiments of the disclosure, PBS, GA and OSP algorithms were applied to the same 13 sample days in Table 7 of FIG. 11. Comparison results are shown in Table 10 of FIG. 15. These results show that an OSP according to embodiments of the disclosure may use 89% fewer simulation evaluations, and strategies identified by an OSP according to embodiments of the disclosure are at least equivalent to those identified by GA and PBS, in terms of the objective function values, for all 13 test cases.

Analysis

A solution space for a study according to an embodiment of the disclosure includes 5250 DR strategies. Although the size of this solution space has been intentionally reduced, as few controllable points are involved, and discrete values are considered for each point, a simulation-based ES optimization according to an embodiment of the disclosure still requires several days to obtain an optimum. In real cases, an on-line DR control optimization should use more controllable points, and higher resolution would be expected. Thus, an ES optimization may not be feasible for an on-line response.

Embodiments of the disclosure provide a method for on-line HVAC control optimization. A method according to embodiments of the disclosure move the computationally intensive optimization to off-line. An optimal strategy pool knowledge base can be generated based on off-line results. This optimal strategy pool may contain many fewer candidate strategies, which makes feasible an on-line simulation-based optimization. A PBS strategy is heuristically adapted for this type of two-stage scheme, and no on-line optimization would be needed. However, experimental results according to embodiments of the disclosure, presented in Table 7 of FIG. 11, suggest that an optimal strategy for the centroid profile of a weather pattern is not necessarily the optimal for the individual weather of this pattern. But, it is likely that an optimal strategy for any individual weather is among the top choices for that pattern's centroid weather. Then, if all top choices for all centroid weathers are selected to generate a pool, such pool may cover the optimal strategies for most individual weathers.

Although, due to time constraints, 13 sample days are tested to validate an OSP approach according to embodiments of the disclosure, the results show that this approach can reduce the on-line optimization time by 99.8%, while still obtaining optimal DR strategies. To aggregate the selected top choices for all weather patterns, a likelihood score based criteria is adopted. An aggregation mechanism should capture the following information: (1) the possibility of appearance for each weather pattern; (2) the characteristics of each weather pattern, such as the temperature range; and (3) the distance between weather patterns.

It is to be understood that although other factors that impact HVAC consumption, such as humidity control, economizer settings, heat recovery, etc, were not considered in a simulation according to an embodiment of the disclosure, a two-stage on-line optimization scheme according to an embodiment of the disclosure is sufficiently generic that those of skill in the art may adapt an approach according to an embodiment of the disclosure to systems with different specifications.

A GA optimization according to embodiments of the disclosure uses about 877 simulation evaluations, on average, to identify an optimal strategy. This may take up to 10 hours on a laptop computer. To find an algorithm that can achieve the same goal within 1 hour, an optimal strategy pool (OSP) according to embodiments of the disclosure was used to aggregate several of the best strategies based on likelihood scores. FIG. 14 illustrates a strategy likelihood spectrum, according to an embodiment of the disclosure. As shown in FIG. 14, 97 spikes can be identified from a strategy likelihood spectrum according to embodiments of the disclosure, which represent 97 strategies to be incorporated into an optimal strategy pool (OSP) according to embodiments of the disclosure.

To validate an OSP algorithm according to embodiments of the disclosure, PBS, GA and OSP algorithms were applied to the same 13 sample days in Table 7 of FIG. 11. Comparison results are shown in Table 10 of FIG. 15. These results show that an OSP according to embodiments of the disclosure may use 89% fewer simulation evaluations, and strategies identified by an OSP according to embodiments of the disclosure are at least equivalent to those identified by GA and PBS, in terms of the objective function values, for all 13 test cases.

System Implementations

It is to be understood that embodiments of the present disclosure can be implemented in various forms of hardware, software, firmware, special purpose processes, or a combination thereof. In one embodiment, the present disclosure can be implemented in software as an application program tangible embodied on a computer readable program storage device. The application program can be uploaded to, and executed by, a machine comprising any suitable architecture.

Figure 16:
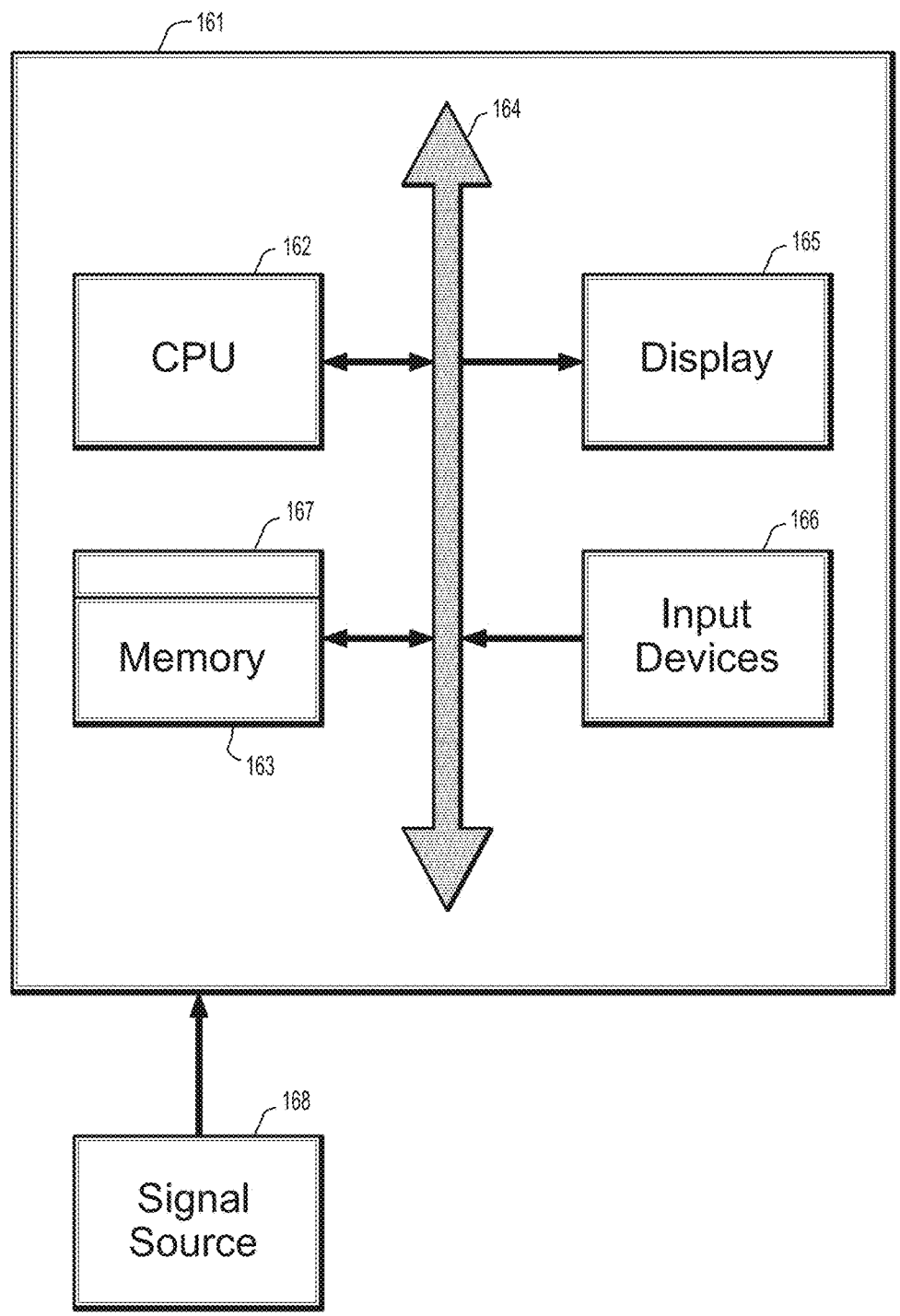
FIG. 16 is a block diagram of an exemplary computer system for implementing a method for a two-stage HVAC demand-response optimization scheme, according to an embodiment of the disclosure.

FIG. 16 is a block diagram of an exemplary computer system for implementing a method for a two-stage HVAC demand-response optimization scheme, according to an embodiment of the disclosure. Referring now to FIG. 16, a computer system 161 for implementing the present disclosure can comprise, inter alia, a central processing unit (CPU) 162, a memory 163 and an input/output (I/O) interface 164. The computer system 161 is generally coupled through the I/O interface 164 to a display 165 and various input devices 166 such as a mouse and a keyboard. The support circuits can include circuits such as cache, power supplies, clock circuits, and a communication bus. The memory 163 can include random access memory (RAM), read only memory (ROM), disk drive, tape drive, etc., or a combinations thereof. The present disclosure can be implemented as a routine 167 that is stored in memory 163 and executed by the CPU 162 to process the signal from the signal source 168. As such, the computer system 161 is a general purpose computer system that becomes a specific purpose computer system when executing the routine 167 of the present disclosure.

The computer system 161 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present disclosure is programmed. Given the teachings of the present disclosure provided herein, one of ordinary skill in the related art will be able to contemplate these and similar implementations or configurations of the present disclosure.

While the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A computer-implemented method of optimizing demand-response (DR) of a heating, ventilation, and air-conditioning (HVAC) system of a building, the method executed by the computer comprising the steps of:

determining a value of an objective function $F_{ij}$ of a HVAC system for each of a plurality of demand-response (DR) strategies j for each of a plurality of weather patterns i that is a weighted sum of an energy cost of the HVAC system and a thermal comfort loss of the HVAC system;

assigning a likelihood score $L_{i,j}$ to each of a selected subset of DR strategies j for each weather pattern i;

selecting the DR strategies with overall likelihood scores $L_j$ that exceed a pre-defined threshold to create an optimal strategy pool of DR strategies, wherein said optimal strategy pool can be searched in real-time for an optimal DR strategy for a given weather pattern; and changing an operational HVAC parameter in the HVAC system based at least in part on the selected DR strategies.

2. The method of claim 1, further comprising performing a simulation of each of the plurality of DR strategies for each of the plurality of weather patterns to determine an hourly energy usage of the HVAC system and an hourly predicted percent dissatisfied (PPD) score of the HVAC system, calculating said energy cost from the hourly energy usage using a time-of-use price model, and calculating said thermal comfort loss by summing the PPD scores for occupied building zones over a 24 hour period.

3. The method of claim 2, wherein said objective function $F_{ij}$ of a HVAC system for each of a plurality of DR strategies for each of a plurality of weather patterns is calculated from $$F_{i,j} = w_C \frac{C_{i,j} - C_{min}}{C_{max} - C_{min}} + w_U \frac{U_{i,j} - U_{min}}{U_{max} - U_{min}},$$

wherein $C_{ij}$ and $U_{ij}$ are the energy cost and the thermal comfort loss, respectively, $C_{min}$ and $U_{min}$ are the minimum energy cost and the thermal comfort loss, respectively, $C_{max}$ and $U_{max}$ are the maximum energy cost and the thermal comfort loss, respectively, and $w_c$ and $w_u$ are predetermined respective energy cost and thermal comfort loss weights.

4. The method of claim 1, wherein determining a selected subset of DR strategies j for each weather pattern i comprises:

sorting the DRs for each weather pattern in ascending order of the objective function $F_{ij}$ values, wherein $j^k$ is a k-th strategy in a sorted list of DR strategies;

finding a DR for each weather pattern $F_i^*$ that is a minimum for all DR's j for the weather pattern i; and selecting those DR's j for which $F_{i,j} \leq \alpha F_i^*$ for a pre-determined positive threshold α.

5. The method of claim 1, wherein said likelihood score $L_{i,j_k}$ of each of the selected subset of DR strategies $j^k$ for each weather pattern i is determined according to $$\sum_{k=1}^{N_i} L_{i,j^k} = 1 \text{ and } \frac{L_{i,j^{k+1}}}{L_{i,j^k}} = \beta,$$

wherein $N_i$ is a total number of selected strategies for each weather pattern i, k=1, 2, . . . , $N_i$−1, and β is a pre-determined ratio.

6. The method of claim 5, further comprising determining an overall likelihood score $L_j$ of DR strategy j for all weather patterns from $$L_j = \sum_{i=1}^{I} p_i L_{i,j},$$

wherein I is a total number of weather patterns, and $p_i$ is a probability that the weather of a particular day is of pattern i.

7. The method of claim 6, further comprising estimating $p_i$ by dividing a number of pattern i days by a total number of recorded days.

8. The method of claim 1, wherein the changing the operation HVAC parameter in the HVAC system comprises at least on of adjusting a fan speed, adjusting a set point, and engaging at least on fan.

9. A computer-implemented method of optimizing demand-response (DR) of a heating, ventilation, and air-conditioning (HVAC) system of a building, the method executed by the computer comprising the steps of:

sorting a plurality of DRs j for each of a plurality of weather patterns i in ascending order of an objective function $F_{ij}$ value, wherein $j^k$ is a k-th strategy in a sorted list of DR strategies;

finding a DR for each weather pattern $F_i^*$ that is a minimum for all DR's j for the weather pattern i;

selecting those DR's j for which $F_{i,j} \leq \alpha F_i^*$ for a pre-determined positive threshold α;

selecting those DR strategies with overall likelihood scores $L_j$ that exceed a pre-defined threshold to create an optimal strategy pool of DR strategies, wherein said optimal strategy pool can be searched in real-time for an optimal DR strategy for a given weather pattern; and changing an operation HVAC parameter in the HVAC system based at least in part on the selected DR strategies.

10. The method of claim 9, further comprising:

assigning a likelihood score $L_{i,j_k}$ to each of a selected subset of DR strategies j for each weather pattern i wherein $$\sum_{k=1}^{N_i} L_{i,j^k} = 1 \text{ and } \frac{L_{i,j^{k+1}}}{L_{i,j^k}} = \beta,$$

wherein $N_i$ is a total number of selected strategies for each weather pattern i, k=1, 2, . . . , $N_i$−1, and β is a pre-determined ratio.

11. The method of claim 10, further comprising determining an overall likelihood score $L_j$ of DR strategy j for all weather patterns from $$L_j = \sum_{i=1}^{I} p_i L_{i,j},$$

wherein I is a total number of weather patterns, and $p_i$ is a probability that the weather of a particular day is of pattern i.

12. The method of claim 9, further comprising performing a simulation of each of the plurality of DR strategies for each of the plurality of weather patterns to determine an hourly energy usage of the HVAC system and an hourly predicted percent dissatisfied (PPD) score of the HVAC system, calculating said energy cost from the hourly energy usage using a time-of-use price model, and calculating said thermal comfort loss by summing the PPD scores for occupied building zones over a 24 hour period.

13. The method of claim 12, wherein said objective function $F_{ij}$ of a HVAC system for each of a plurality of DR strategies for each of a plurality of weather patterns is calculated from $$F_{i,j} = w_C \frac{C_{i,j} - C_{min}}{C_{max} - C_{min}} + w_U \frac{U_{i,j} - U_{min}}{U_{max} - U_{min}},$$

wherein $C_{ij}$ and $U_{ij}$ are the energy cost and the thermal comfort loss, respectively, $C_{min}$ and $U_{min}$ are the minimum energy cost and the thermal comfort loss, respectively, $C_{max}$ and $U_{max}$ are the maximum energy cost and the thermal comfort loss, respectively, and $w_c$ and $w_u$ are predetermined respective energy cost and thermal comfort loss weights.

14. The method of claim 9, further comprising determining a value of the objective function $F_{ij}$ of a HVAC system for each of a plurality of DR strategies j for each of a plurality of weather patterns i that is a weighted sum of an energy cost of the HVAC system and a thermal comfort loss of the HVAC system.

15. A non-transitory program storage device readable by a computer, tangibly embodying a program of instructions executed by the computer to perform the method steps for optimizing demand-response (DR) of a heating, ventilation, and air-conditioning (HVAC) system of a building, the method comprising the steps of:
  sorting a plurality of DRs j for each of a plurality of weather patterns i in ascending order of an objective function $F_{ij}$ value, wherein $j^k$ is a k-th strategy in a sorted list of DR strategies;
  finding a DR for each weather pattern $F_i^*$ that is a minimum for all DR's j for the weather pattern i;
  selecting those DR's j for which $F_{i,j} \leq \alpha F_i^*$ for a pre-determined positive threshold α; and
  selecting those DR strategies with overall likelihood scores $L_j$ that exceed a pre-defined threshold to create an optimal strategy pool of DR strategies,
  wherein said optimal strategy pool can be searched in real-time for an optimal DR strategy for a given weather pattern; and
  changing an operational HVAC parameter in the HVAC system based at least in part on the selected DR strategies.

16. The computer readable program storage device of claim 15, the method further comprising:
  assigning a likelihood score $L_{i,j_k}$ to each of a selected subset of DR strategies j for each weather pattern i wherein $$\sum_{k=1}^{N_i} L_{i,j_k} = 1 \text{ and } \frac{L_{i,j_{k+1}}}{L_{i,j_k}} = \beta,$$

wherein $N_i$ is a total number of selected strategies for each weather pattern i, k=1, 2, . . . , $N_i$-1, and β is a pre-determined ratio.

17. The computer readable program storage device of claim 16, the method further comprising determining an overall likelihood score $L_j$ of DR strategy j for all weather patterns from $$L_j = \sum_{i=1}^{I} p_i L_{i,j},$$

wherein I is a total number of weather patterns, and $p_i$ is a probability that the weather of a particular day is of pattern i.

18. The computer readable program storage device of claim 15, the method further comprising performing a simulation of each of the plurality of DR strategies for each of the plurality of weather patterns to determine an hourly energy usage of the HVAC system and an hourly predicted percent dissatisfied (PPD) score of the HVAC system, calculating said energy cost from the hourly energy usage using a time-of-use price model, and calculating said thermal comfort loss by summing the PPD scores for occupied building zones over a 24 hour period.

19. The computer readable program storage device of claim 18, wherein said objective function $F_{ij}$ of a HVAC system for each of a plurality of DR strategies for each of a plurality of weather patterns is calculated from $$F_{i,j} = w_C \frac{C_{i,j} - C_{min}}{C_{max} - C_{min}} + w_U \frac{U_{i,j} - U_{min}}{U_{max} - U_{min}},$$

wherein $C_{ij}$ and $U_{ij}$ are the energy cost and the thermal comfort loss, respectively, $C_{min}$ and $U_{min}$ are the minimum energy cost and the thermal comfort loss, respectively, $C_{max}$ and $U_{max}$ are the maximum energy cost and the thermal comfort loss, respectively, and $w_c$ and $w_u$ are predetermined respective energy cost and thermal comfort loss weights.

20. The computer readable program storage device of claim 15, the method further comprising determining a value of the objective function $F_{ij}$ of a HVAC system for each of a plurality of DR strategies j for each of a plurality of weather patterns i that is a weighted sum of an energy cost of the HVAC system and a thermal comfort loss of the HVAC system.

* * * * *